United States Patent Office 2,844,906
Patented July 29, 1958

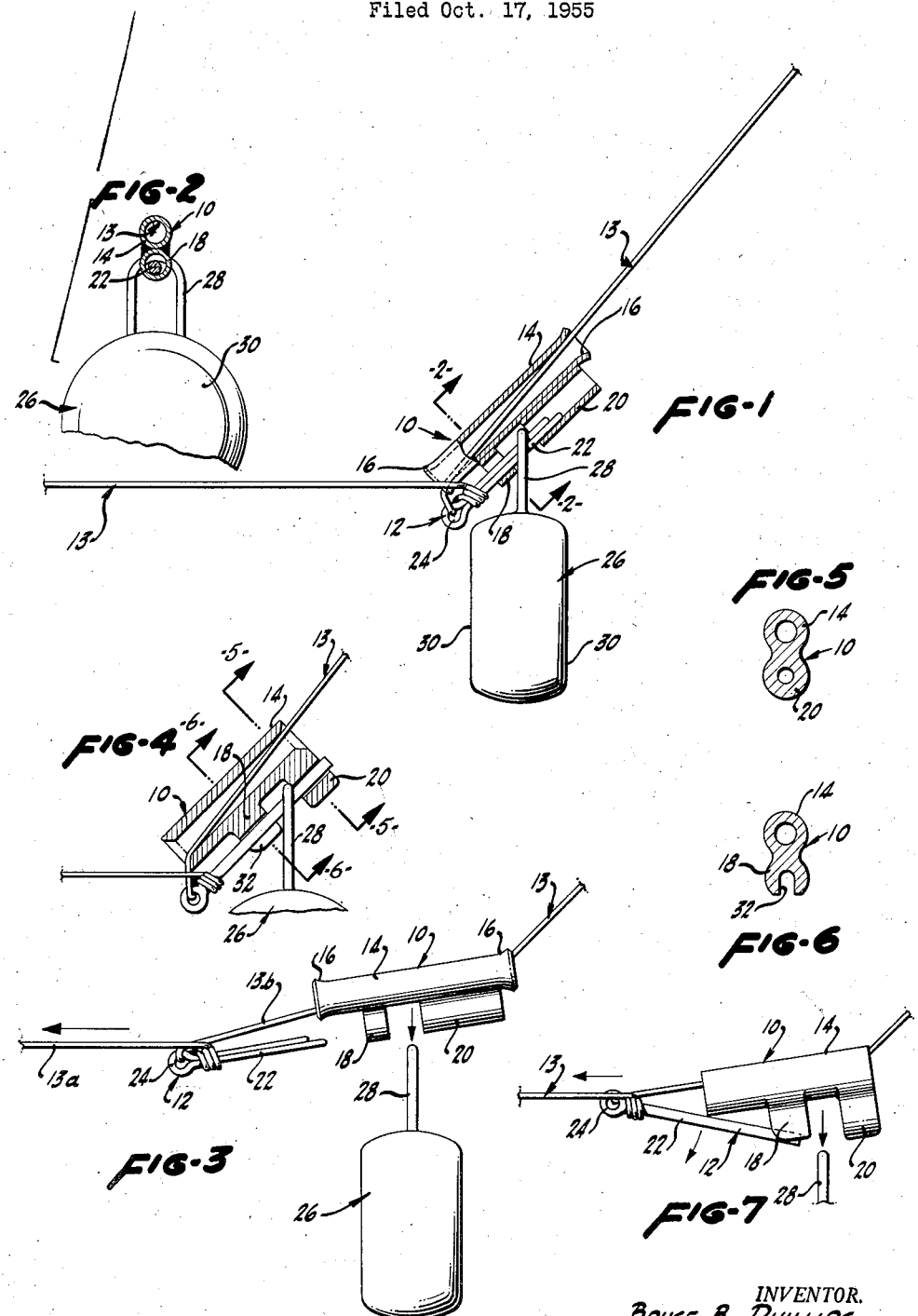

2,844,906

SINKER RELEASE

Bruce B. Phillips, San Pablo, Calif.

Application October 17, 1955, Serial No. 540,788

4 Claims. (Cl. 43—43.12)

This invention relates to fishing line sinker release devices.

When trolling for game fish it is desired that a sinker be employed of sufficient weight to permit the lure or bait to be submerged to a predetermined depth, and that the arrangement securing the sinker with the line include suitable mechanism for release of the sinker when a fish is hooked. In this way the fisherman is enabled to obtain maximum enjoyment from the "play" of a fish through the use of his carefully selected combination of rod, reel and line, which is not the case where there is added to the weight and strength of a hooked fish the deadweight of a non-detachable sinker.

For providing such arrangement, many different sinker release mechanisms have been devised and constructed, as for example of the type illustrated in U. S. Patent No. 1,033,464 wherein movable sections, which receive and support the loop of the releasable member, when caused to separate against frictional restraining means, effect a release of the sinker; or in the more recent U. S. Patent No. 2,562,054, wherein a spring pressed pin is mounted in a casing, extending through the loop or eye of the sinker, and is reciprocable against the urge of the spring to effect a release of the sinker.

However, for various reasons such prior release mechanisms have not gained the popularity to which they would seem to be entitled. As a fisherman, it is my belief that principal among such reasons is the fact that most of the prior mechanisms are so designed that: (1) they are responsive to a sudden pull both on the line leading the release mechanism and on the line following the mechanism, wherefore when the fisherman accidentally or otherwise inadvertently causes a sudden pull on the line following the mechanism, there is an unwanted release of the sinker; and/or (2) the mechanism, after having released the sinker, remains itself in fixed position, and is not freely slidable along the length of the line. Other disadvantages to such prior devices also contributing to their failure to gain in acceptance and popularity are: That they are not uniformly reliable in effecting loss or drop of the sinker at the critical moment following the "strike," or hooking of the fish. That they have been expensive to manufacture because of the intricacy of the apparatus employed. And, where they are used in salt water, that they are extremely short lived due to the moving parts utilized therein and the corrosive action of the water on the materials used in such parts.

It is the object of my invention to provide a novel and improved sinker release device (and arrangement therefor with the line) which permits the detachment of the sinker from a fishing line when a fish is caught, which device will be free of the defects of the prior sinker release mechanisms and devices above described, yet which is inexpensive in manufacture, effective in operation and practical in use.

As a particular object, the invention contemplates the provision of an improved sinker release adapted to be selectively secured on the line and to support the sinker as the said sinker, line and release are moved through the water in trolling, characterized by the device being responsive only to a sudden pull on the line following the release, to release the sinker.

As a further particular object, the invention contemplates the provision of an improved sinker release of the above type wherein the device is further characterized by its being adapted, after release of the sinker, for free sliding movement on the line.

The above as well as other objects, advantages and features of the invention will be readily apparent from the accompanying drawing illustrating the invention in accordance with its preferred embodiments, the subjoined detailed description, and the appended claims.

In the drawing:

Figure 1 is a sectional view in side elevation showing my sinker release in position on the line, with the sinker supported thereby;

Figure 2 is a cross-sectional view through the device and bail of the sinker, taken along line 2—2 of Figure 1;

Figure 3 is a side elevation of the device according to Figure 1, showing the pin moved, responsive to a sudden pull on the line following the device, to releasing position;

Figure 4 is a view similar to Figure 1 but showing a modified form of my sinker release;

Figures 5 and 6 are cross-sectional views through the body member only of the release shown in Figure 4, taken along lines 5—5 and 6—6, respectively; and Figure 7 is a side elevation of the device according to Figure 4, showing the pin moved to releasing, free-sliding position on the line.

Referring now to the drawing in detail, and first to Figures 1 through 3 in particular:

The sinker release is comprised of an elongated body member generally indicated by the numeral 10 and a member or pin 12, and both such members are separate and adapted to be slidably carried on the fishing line 13.

The body member may as shown be formed of three tubular sections, providing an upper elongated tubular section 14 having flared end portions 16 and through which extends the fishing line 13, and spaced lower tubular sections 18, 20, in axial alignment and soldered, brazed or otherwise secured in fixed positions to the upper section 14, and adapted to receive and support the pin 12.

The pin 12 may as shown be of the "cotter pin" type whose prongs or shank portion 22, when inserted in position in the bores of the lower tubular sections 18, 20, with its eye 24 adjacent the forward opening of the bore of the upper tubular section 14 (see Figure 1), are long enough to extend sufficiently into the bore of tubular section 20, thereby affording a firm support for the sinker 26.

The sinker 26 is of conventional construction, formed by cast metal, stone or other heavy material, with an eye 28 at its upper end for engagement with the pin 12. In the case of sinkers of comparatively light weight, i. e. of from 2 to 16 ounces, it is preferred for reasons hereinafter described that they be provided with relatively flat forward and rearward faces, indicated at 30, as a means of providing increased "drag" or resistance to movement of the sinker through the water.

In assembling a sinker and my sinker release for use in trolling, a sinker 26 of proper weight is selected, according to the depth to which the bait or lure is to be submerged during trolling, and the pin 12 and body member 10 slid along the line 13 to provide the desired length of line "leading" the lure or bait used, necessary to the obtaining of a natural swimming action from such lure or bait. At this point on the line, the line indicated by 13a, "leading" the eye 24 of the pin, is looped back and turned around the shank 22 of the pin adjacent the eye 24, preferably two or three times (three are illustrated), after which the line is crossed over and forward inside the line, indicated by 13b, "following" the eye 24 (see for purposes of this description, Figure 3). The eye 28 of the sinker is next positioned in the space between the two tubular sections 18, 20, and the shank 22 of the pin inserted in the two sections 18, 20, to pass through the eye 28 of the sinker, securing the sinker as shown in Figure 1.

With the sinker thus disposed and with the release used for its primary purpose in fishing, namely, in trolling, the line "following" the release will as shown be substantially horizontal while the line "leading" the release will be inclined to the surface; such that the body member 10 with sinker 26 will, due to the weight of the sinker 26, the pin being fixed in its line position, be thus carried in fixed position on the line. When however, a fish "strikes" the sudden pull on the line following the release will cause the pin 12 to move "forward" with the line, i. e. to the left as shown in Figure 3. Opposing this, the inertia and drag resistance of the sinker 26 will cause the body member 10 of the release to resist such sudden forward movement; whereupon the line 13 will thus be drawn "forward" through the upper tubular section 14, the pin 12 withdrawn from the lower tubular sections 18, 20, and eye 28 of the sinker, releasing the sinker. With the release of the sinker and withdrawal of the pin 12 from the tubular section 18, the pin will, due to the tension on the line 13, free itself from the turns of the line, and the pin 12 and body member 10 will thereafter slide on the line, leaving the line unhampered so that the fisherman may enjoy the full play of the fish.

From the arrangement above described, it will be seen that should there be a sudden pull on the line "leading" the release, i. e. the line to the right thereof as shown in Figure 1, the line, release and sinker will together move responsive to the pull without a release of the sinker.

In Figures 4 through 7 I have illustrated a modified form of my sinker release, of a "quick acting" type, which has a cast body member 10 differing in construction from that of Figure 1 in that the lower tubular section 18 is provided with a longitudinal slot 32, and in that its lower tubular section 20, forming the support for the pin 12, is of relatively short length. With such arrangement, when the pin 12 is caused to be moved "forward" with the line, responsive to a sudden pull, as soon as the end of the pin clears the tubular section 20, the pin is caused to be swung downward due to the weight of the supported sinker, releasing the sinker (as the pin is swung down and/or simultaneously moved further forward responsive to the initial "sudden pull"), whereafter the pin is permitted to twist around on the line (as indicated by the arrow in Figure 7), unwinding itself, and releasing the pin, and body member, for free-sliding movement in either direction on the line.

From the foregoing description, taken in connection with the drawing, it is thought that the construction, operation and many advantages of my sinker release will be readily understood without requiring a more detailed explanation. Moreover, while the invention has been illustrated and described according to two preferred embodiments thereof, the sinker release is as will be apparent capable of variation and modification without departing from the spirit of the invention. It is therefore understood that the invention is not to be limited to the specific embodiments illustrated, but rather is to be entitled such variations and modifications as fall within the scope of the appended claims.

What I claim is:

1. For use in trolling: a sinker release including a body member slidably carried on a fishing line and having a pin engaging means, and a pin having a line engaging eye at one end slidable on the fishing line following the body member, said body member and pin comprising a releasable sinker supporting means wherein, when the line following the eye of the pin is wrapped back around the shank portion of the pin and the pin then engaged in the pin engaging means of the body member, said pin will be adapted to support a sinker and to fix the position of the pin, body member and supported sinker, respectively, along the length of the line as the same are moved through the water in trolling, said pin being responsive to a sudden pull on the line following the release to release the pin from the pin engaging means for the body member to drop free the sinker, and whereafter said body member and pin are each freely slidable on the line.

2. For use in trolling: a sinker release comprising a body member having an upper bore and a lower pin engaging means in approximate parallel alignment with said bore, said body member being carried on a fishing line which extends through said bore, and a pin having a straight shank portion and a line engaging eye at one end slidable on the fishing line following the body member, said pin being adapted when the line following the eye of the pin is wrapped back around the pin and the straight shank portion inserted in said pin engaging means to support a sinker and to fix the position of the release along the length of the line as the release and supported sinker are moved through the water in trolling, said pin being responsive to a sudden pull on the line following the release to release the pin from the pin engaging means of the body member and to permit the sinker to drop free from the pin and release, and whereafter said body member and pin are each freely slidable on the line.

3. For use in trolling: a sinker release comprising a body member having an upper bore and a lower pin engaging means in approximate parallel alignment with said bore, said body member being slidably carried on a fishing line which extends through said bore, and a pin having a straight shank portion and a line engaging eye at one end slidable on the fishing line following the body member, said pin being adapted when the line following the eye of the pin is wrapped back around the pin and the straight shank portion inserted in said pin engaging means to support in cooperation with the body member a sinker and to fix the position of the release along the length of the line as the release and supported sinker are moved through the water in trolling, said pin, responsive to a sudden pull on the line following the release, being adapted to move with the line without imparting additional movement to the body member through which the line slides, to release the pin from the pin engaging means of the body member and to permit the sinker to drop free from the pin and release.

4. For use in trolling: a sinker release comprising a body member having an upper longitudinal bore and a lower pin engaging means including a pin receiving bore in approximate parallel alignment with said body member bore, said body member being slidably carried on a fishing line which extends through said upper longitudinal bore, and a pin having a straight shank portion and a line engaging eye at one end slidable on the fishing line following the body member, said pin being adapted when the line following the eye of the pin is wrapped back around the pin and the straight shank portion inserted in the pin receiving bore to support a sinker on said pin and to fix the position of the release along the length of the line as the release and supported sinker are moved through the water in trolling, said pin and body member with the supported release being adapted, responsive to a sudden pull on the line following the release, to permit movement of said pin with the line while the line is drawn through the body member, to withdraw said pin from the pin receiving bore and to permit the sinker to drop free from the pin and release.

References Cited in the file of this patent

UNITED STATES PATENTS

| | | |
|---|---|---|
| 2,271,899 | Miller | Feb. 3, 1942 |
| 2,322,536 | Miller | June 22, 1943 |
| 2,608,017 | Hinkson | Aug. 26, 1952 |
| 2,735,212 | Baum | Feb. 21, 1956 |